March 31, 1953  G. PIELSTICK  2,633,111
METHOD OF AND MEANS FOR LUBRICATING EXHAUST-VALVE
SHANKS IN COMBUSTION ENGINES
Filed May 5, 1949
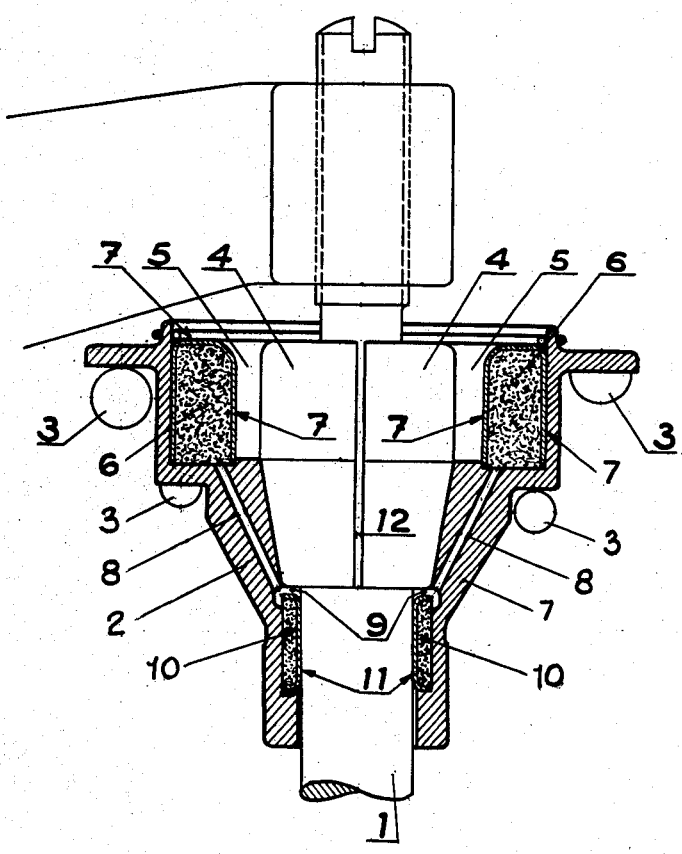
INVENTOR.
GUSTAV PIELSTICK
BY
Mock & Blum
ATTORNEYS Patented Mar. 31, 1953

2,633,111

UNITED STATES PATENT OFFICE 2,633,111

METHOD OF AND MEANS FOR LUBRICATING EXHAUST-VALVE SHANKS IN COMBUSTION ENGINES

Gustav Pielstick, Saint-Germain-en-Laye, France

Application May 5, 1949, Serial No. 91,564
In France May 27, 1948

2 Claims. (Cl. 123—90)

This invention relates to the lubrication of the shanks of exhaust valves in internal combustion engines. It is becoming more and more necessary to provide for a continuous lubrication of the exhaust valve shanks in internal combustion engines because of the continual increase in the temperatures of the exhaust gases from such engines.

In those engines in which the valve rocker-arm assembly is not confined in a casing therefore, such lubrication is generally accomplished manually by means of an oiler, and is accordingly only insured in an uncertain and discontinuous manner. Such discontinuous lubrication results in the fact that the valve-shank is supplied with a more or less considerable amount of oil the greater portion of which is almost immediately burnt up or expelled, so that the lubrication remains inadequate for long periods of time thereafter.

It has been found impracticable to generalize lubrication using a special mechanically-actuated pump or drip-feed lubricators, because of its high cost and the complicated piping system required by it.

In contradistinction to such insufficient lubrication, superabundant lubrication is encountered in some systems of valve-shank lubrication, this in particular being the case where the valve-shank is supplied in oil through a takeoff from the forced-feed lubrication system of the engine. In this last-mentioned case, there is a formation of carbon deposits on the valve guides, resulting in considerable wear thereon.

It is a general object of this invention to provide means for continuously lubricating the exhaust-valve shanks in internal combustion engines which is free of the above shortcomings.

An essential object of the invention is to provide means for delivering lubricant continuously and in sufficient predetermined amounts to the said valve-shanks, said means comprising felt elements, tapes, and the like absorbent means or pads imbibed with lubricant and preferably housed within the spring-seating of the valve.

According to a feature of the invention, the above-mentioned absorbent lubricating pads are supplied with lubricant by being connected with a suitable source thereof. In this manner, the lubricating tapes or felt pads are effective to feed a uniform amount of lubricant to the valve-shank, even though they themselves may be irregularly supplied from said source.

Moreover, when the engine is stopped, there forms a film of oil over the valve-shank, so that lubrication thereof will be automatically insured upon the engine being again started.

Where the engine is provided with a valve-rocker assembly housed within a casing, and having all its elements connected with a one-shot lubrication system or a forced-feed lubrication system, and where the valve-spring seating is secured to the end of the valve-shank by means of a two-part stirrup member, it is preferable to complete the lubricating device of the invention with a small additional wiper ring to prevent excessive uncontrollable amounts of oil from penetrating through the gap in the stirrup assembly.

The accompanying drawing, given in a purely illustrative and not a limitative sense, shows in axial section, one form of embodiment of a valve-shank lubricator device according to the invention.

In the exemplary embodiment shown, the valve-shank is illustrated at 1, the related valve-spring seating at 2 and the valve-springs at 3. The valve-shank 1 is preferably mounted by means of a ring 4 in two parts.

In the recess 5 within the spring-seat 2 there is arranged an annular absorbent pad 6. The pad 6 may be made of felt, or it may comprise a wick, tape, or the like. It is imbibed with oil or grease and is confined within an annular housing 7 as of perforate steel sheeting or the like.

A duct 8 formed through the body of the spring-seat 2 terminates in a space 9 in which is a wiper or stopper-ring 10 which may similarly be formed of a felt pad and contained in a perforate sheet-metal ring 11. The ring 10—11 serves to prevent an excessive amount of oil from penetrating through the slot or gap 12 between the ring elements 4—4.

The lubricator ring assembly 6 is supplied with lubricant from a suitable source, through any appropriate supply means which form no part of the invention.

It will be understood that the invention is not restricted to the specific embodiment thereof illustrated and described, but is meant to include any variations thereof not exceeding the purview of the ensuing claims.

What I claim is:

1. In an exhaust-valve assembly particularly for use in internal combustion engines, a valve spring seating member surrounding said valve and the related valve stem, an annular retainer member housed within said spring seating member around said valve, absorbent material freely contained within said retainer member and always imbibed with lubricant constituting thereby a storage space for lubricant, an annular space around said valve stem and provided in the lower part of said retainer member, a second body of absorbent material freely located in said latter space thereby being situated below the first absorbent material and surrounding the valve stem, metered duct means between said two superposed spaces containing the absorbent bodies to feed a continuous metered amount of lubricant from the first to the second of said bodies, said duct means being formed through the body of said spring seating member, said second body of absorbent material being located beyond the delivery outlet of said duct means and intended to deliver the lubricant without excess to the valve stem.

2. In an exhaust valve assembly particularly for use in internal combustion engines, a valve spring seating member surrounding said valve and the related valve stem, an annular retainer member housed within said spring seating member around said valve, absorbent material freely contained within said retainer member and always imbibed with lubricant constituting thereby a storage space for lubricant, an annular space around said valve stem and provided in the lower part of said retainer member, a second body of absorbent material freely located in said latter space thereby being situated below the first absorbent material and surrounding the valve stem, metered duct means between said two superposed spaces containing the absorbent bodies to feed a continuous metered amount of lubricant from the first to the second of said bodies.

GUSTAV PIELSTICK.

REFERENCES CITED

The following references are of record in the file of this patent:

UNITED STATES PATENTS

| Number | Name | Date |
| --- | --- | --- |
| 1,263,901 | Joseph | Apr. 23, 1918 |
| 1,344,347 | Lee | June 22, 1920 |
| 1,714,954 | Hanson et al. | May 28, 1929 |
| 1,930,368 | Nelson | Oct. 10, 1933 |
| 2,419,708 | Cummings | Apr. 29, 1947 |